3,111,532
PROCESS FOR PRODUCING ARENE
METAL CARBONYLS
John E. Wyman, St. Albans, W. Va., assignor to Union
Carbide Corporation, a corporation of New York
No Drawing. Filed Oct. 29, 1958, Ser. No. 770,263
7 Claims. (Cl. 260—438)

This invention relates to organo-metallic carbonyls. More particularly, the invention relates to a process for producing arene metal carbonyls.

We have now discovered a process for producing arene metal carbonyls where the arene moiety is an aromatic hydrocarbon group containing the benzenoid ring system and the metal is chromium, molybdenum or tungsten. Examples of such arene metal carbonyls are benzene chromium tricarbonyl, $C_6H_6Cr(CO)_3$, and mesitylene tungsten tricarbonyl, $(CH_3)_3C_6H_3W(CO)_3$. The benzenoid ring system is the six-carbon unsaturated ring which may be represented by the structural formula:

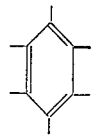

According to the process of this invention a bis(aromatic hydrocarbon) metal compound is reacted with a metal hexacarbonyl in an inert liquid hydrocarbon solvent to produce an (aromatic hydrocarbon) metal tricarbonyl. For example, bis(benzene)molybdenum reacts with molybdenum hexacarbonyl in a benzene solvent to yield benzene molybdenum tricarbonyl.

The process of this invention may be represented by the equation:

$$Ar_2M + M(CO)_6 \rightarrow 2ArM(CO)_3$$

wherein Ar represents an aromatic hydrocarbon compound containing the benzenoid ring system and M is chromium, molybdenum or tungsten.

The aromatic hydrocarbon groups may be benzene; alkyl-substituted benzenes such as toluene, cumene, n-butyl benzene, mesitylene, xylene and hexamethylbenzene; aryl-substituted benzenes such as diphenyl and terphenyl; alkaryl-substituted benzenes such as tolyl benzene, mesityl benzene and the ditolyls; and aralkyl-substituted benzenes such as diphenyl methane, diphenyl ethane and p,p′-diethyldiphenyl methane.

The bis(aromatic hydrocarbon) metal compounds useful in the process of this invention may be prepared by the methods described in several publications by E. O. Fischer and coworkers. See, for example, Z. Naturforshung 10(b), 665 (1955); Chem. and Ind. 1956, 153; Z. Anorg. Allgem. Chem. 286, and Angew. Chem. 68, 462 (1956).

The metal hexacarbonyls useful in the process of this invention may be prepared by the procedures described in Brimm, Lynch and Sesny, J. Am. Chem. Soc. 76, 3831 (1954).

The reaction of the bis(aromatic hydrocarbon)metal compound and the metal carbonyl may be carried out in an aliphatic organic solvent such as heptane or petroleum ether but an aromatic solvent of the same compound that forms the organic moiety of the bis(aromatic hydrocarbon)metal compound is preferred.

Oxygen and moisture should be excluded in order to obtain the best yield of product and this may be done by carrying out the reaction in an atmosphere of inert gas such as nitrogen or argon.

The temperatures at which the reaction may be carried out vary over a considerable range of 175° C. to 300° C. Temperatures in the range of 225° C. to 275° C., are preferred. Temperatures in excess of the decomposition temperature of the products should be avoided.

When the boiling point of the inert hydrocarbon solvent is below the operable temperature range for the process, the reaction may be conveniently carried out in a pressure vessel such as an autoclave.

The time necessary for carrying out the reaction may vary over wide limits depending on the temperature employed. The yields are not materially reduced by maintaining the reaction mixture under reaction conditions for extended periods of time. Generally, it is preferred to maintain the reactants under the desired conditions for at least 15 minutes.

For example, 8.3 grams of bis(toluene)chromium, 200 milliliters of nitrogen-purged toluene, and 7.7 grams of chromium hexacarbonyl were placed in a 300 milliliter stainless steel autoclave and the vessel was closed. This reaction was carried out in the absence of air and moisture under a nitrogen atmosphere. The autoclave was heated at 250° C. with rocking for 8 hours. The autoclave was allowed to cool to room temperature. The contents were removed, filtered and the solvent removed under reduced pressure to yield 0.2 gram of yellow crystalline toluene chromium tricarbonyl. Similar results may be obtained using normal heptane as a solvent in place of toluene.

Other examples of the process of this invention are: the reaction of bis(diphenyl)chromium and chromium hexacarbonyl in heptane to give diphenyl chromium tricarbonyl; the reaction of bis(cumene)chromium and chromium hexacarbonyl in cumene to give cumene chromium tricarbonyl; the reaction of bis(mesitylene)molybdenum and molybdenum hexacarbonyl in mesitylene to give mesitylene molybdenum tricarbonyl; the reaction of bis(diphenylethane)molybdenum and molybdenum hexacarbonyl in diphenylethane to give diphenylethane molybdenum tricarbonyl; and the reaction of bis(hexamethylbenzene)tungsten and tungsten hexacarbonyl in hexamethylbenzene to give hexamethylbenzene tungsten tricarbonyl.

The compounds prepared by the process of this invention may be used to deposit a metallic mirror on various substrates. All of the compounds of this invention may be decomposed by employment of temperatures in excess of 400° C. to form a metallic film or coating on materials such as glass, glass cloth, resins and metals. The metallic coatings provide electrically conducting coatings for such substances as glass cloth and provide corrosion resistant coatings for metals.

For coating glass cloth, a quantity of an (aromatic hydrocarbon)metal carbonyl of this invention is sealed in an evacuated glass tube with a strip of glass cloth which has previously been dried in an oven at 150° C. for one hour; the tube is then heated to about 400° C. for one hour, cooled and opened. The glass cloth increases in weight by up to about 0.01 gram per gram of glass cloth and has a resistivity of several ohms per centimeter. Thus, a conducting cloth may be prepared which is useful for the reduction of static charge.

For example, a piece of thin copper wire about 43 millimeters long, a piece of sapphire rod 3 millimeters in diameter and 22 millimeters long, and a rectangular piece of glass cloth about 50 x 20 millimeters average dimension were placed in a 30 millimeter O.D. glass tube 2 feet long. A glazed porcelain boat containing 1 gram of toluene chromium tricarbonyl was placed in the tube which was then purged with argon and heated to 300° C. The boat was then pushed into the hot zone. After 45 minutes, a chromium plate was deposited on the objects as well as on the walls of the tube, and toluene was condensing on the cool downstream end of the tube. The glass cloth had attained a very dark metallic luster and would conduct an electric current. The copper wire had a dull, even coating of chromium metal over its entire length. The sapphire rod had an even, bright, shiny surface coating of chromium metal, and this chromium plate had a resistance of 150 ohms from one end to the other.

What is claimed is:
1. Process for producing an (aromatic hydrocarbon) metal tricarbonyl which comprises reacting in an inert hydrocarbon solvent (1) a bis(aromatic hydrocarbon) metal compound and (2) a metal hexacarbonyl, which process is represented by the equation:

$$Ar_2M + M(CO)_6 \rightarrow 2ArM(CO)_3$$

wherein Ar is an aromatic hydrocarbon group containing the benzenoid ring system and the metal M is the same in both reactants and is selected from the class consisting of chromium, molybdenum and tungsten.

2. Process for producing an (aromatic hydrocarbon) metal tricarbonyl which comprises reacting in an inert hydrocarbon solvent (1) a bis(aromatic hydrocarbon) metal compound and (2) a metal hexacarbonyl, which process is represented by the equation:

$$Ar_2M + M(CO)_6 \rightarrow 2ArM(CO)_3$$

wherein Ar is an aromatic hydrocarbon group selected from the class consisting of benzene, alkyl-substituted benzenes, aryl-substituted benzenes, alkaryl-substituted benzenes and aralkyl-substituted benzenes and the metal M is the same in both reactants and is selected from the class consisting of chromium, molybdenum and tungsten.

3. Process in accordance with claim 2 wherein said inert hydrocarbon solvent is the same aromatic hydrocarbon that forms the organic moiety of the bis(aromatic hydrocarbon)metal compound.

4. Process in accordance with claim 2 wherein said reaction is carried out under pressure in a pressure vessel.

5. Process in accordance with claim 2 wherein the reaction temperature is in the range from about 225° C. to about 275° C.

6. Process for producing toluene chromium tricarbonyl which comprises reacting bis(toluene)chromium and chromium hexacarbonyl with toluene as a solvent.

7. Process for producing cumene chromium tricarbonyl which comprises reacting bis(cumene)chromium and chromium hexacarbonyl with cumene as a solvent.

References Cited in the file of this patent
UNITED STATES PATENTS
2,870,180    Kozikowski et al. _____ Jan. 20, 1959

OTHER REFERENCES
Fischer et al.: "Chem. Berichte," No. 11 (1957), pages 2532–2536 (copy in Div. 6).
Nicholls et al.: "Proceedings of the Chemical Society" (London) May 1958 (copy in Scientific Library), p. 152.
Piper et al.: J. Inorg. Nucl. Chem., 1956, vol. 3, page 104, Pergamon Press Ltd., London.
Angew. Chem., vol. 69, 1957, p. 715.
LaChimica E. L' Industria, XL–4–1958, pp. 287–289.